May 5, 1964  R. E. PERRY ETAL  3,132,233
HYDRAULIC DRIVE FOR WELDING TRANSFORMER
Filed Jan. 10, 1962  8 Sheets-Sheet 1
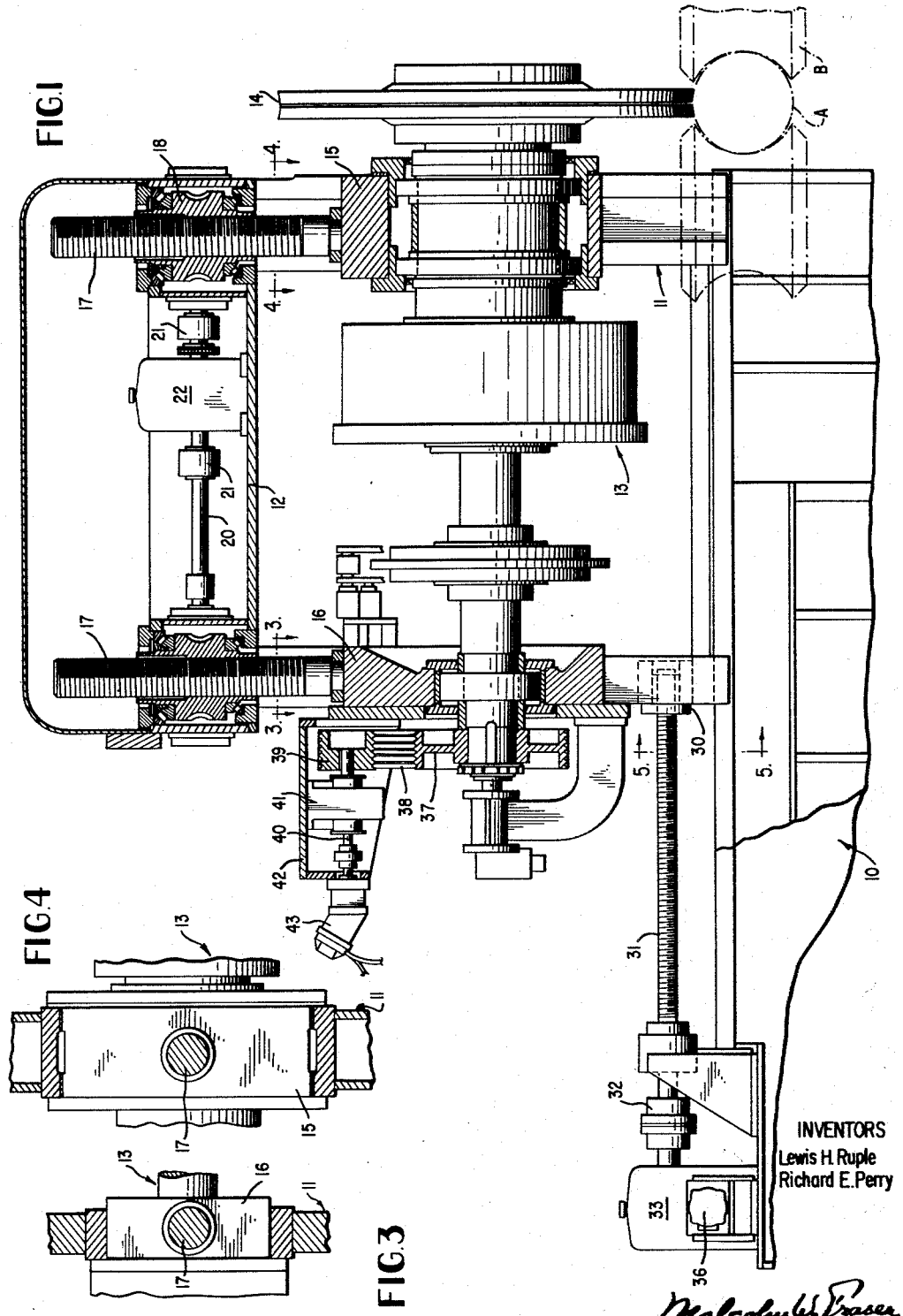
INVENTORS
Lewis H. Ruple
Richard E. Perry
Malcolm W. Fraser
ATTORNEY

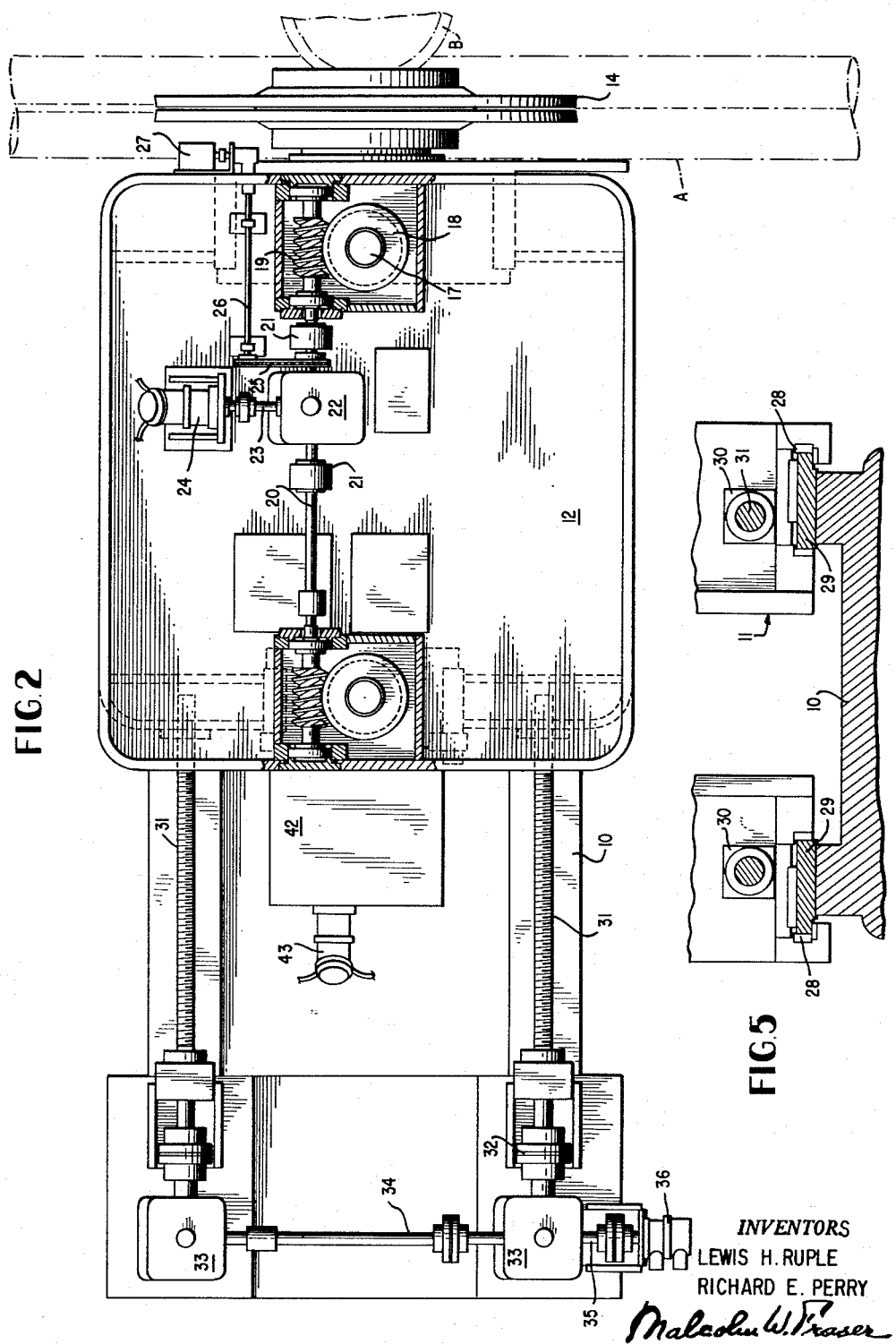

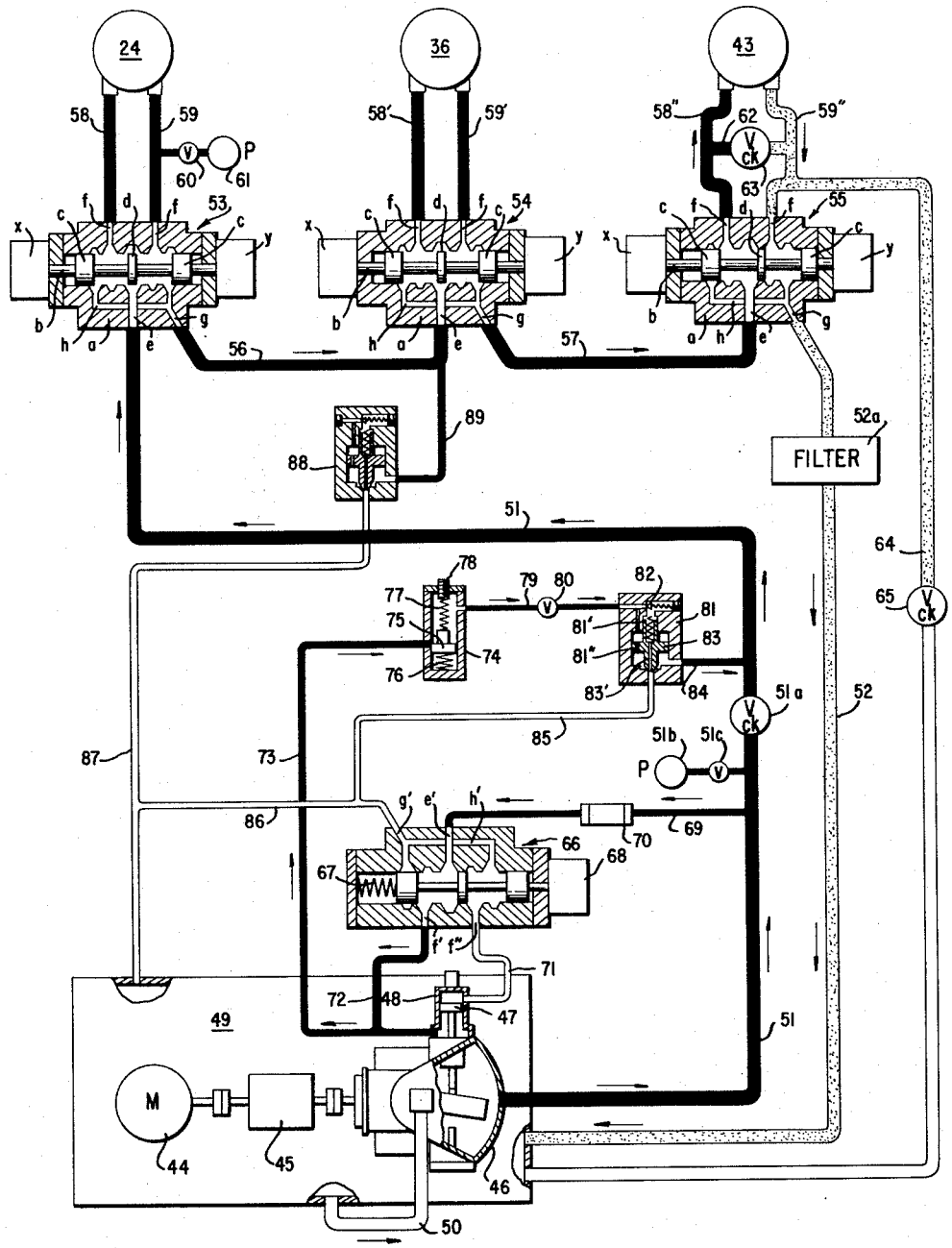
FIG. 6 — MILL RUNNING CONDITION
NO ADJUSTMENTS TAKING PLACE
INVENTORS
LEWIS H. RUPLE
RICHARD E. PERRY

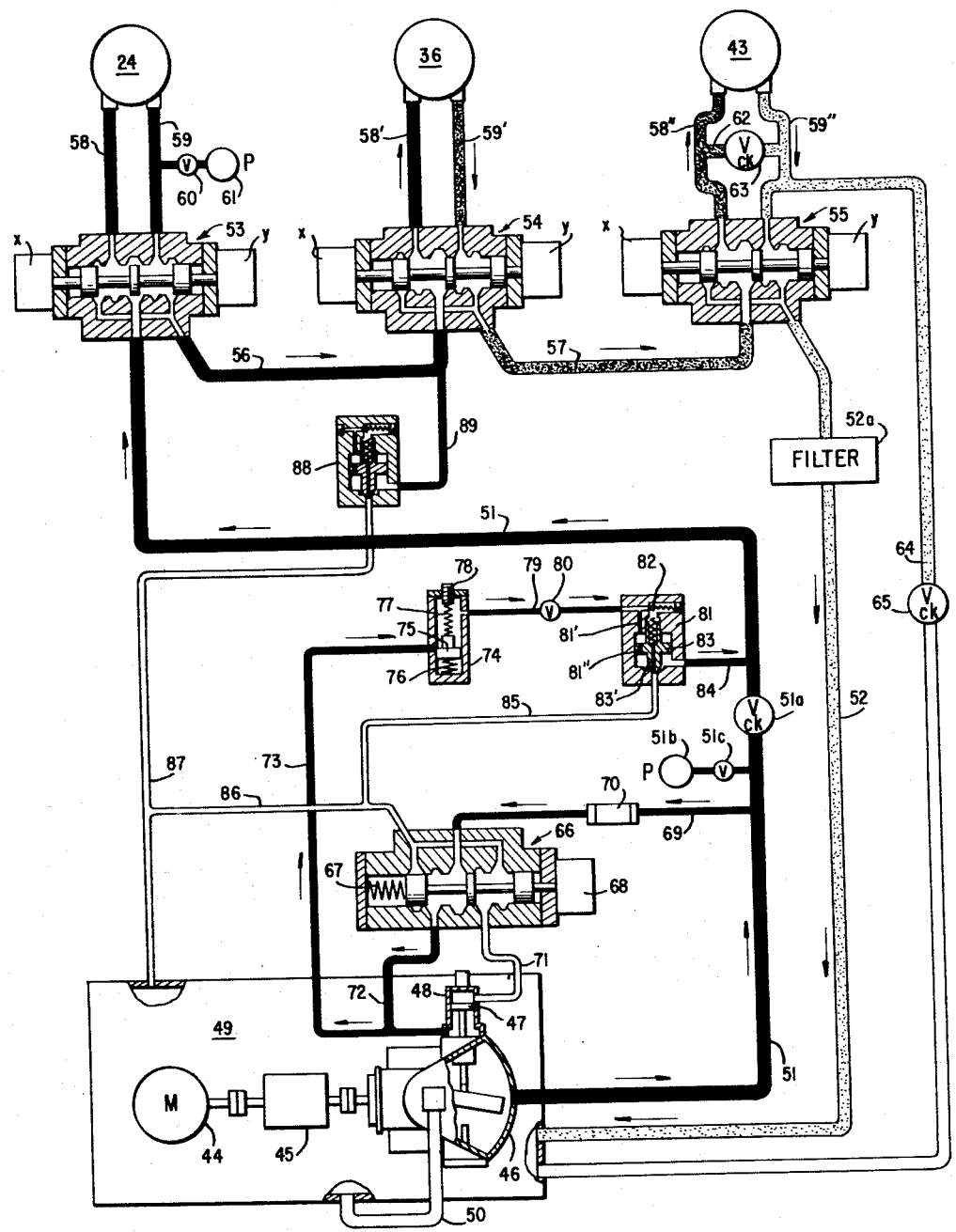
FIG.7 - MILL RUNNING CONDITION HORIZONTAL ADJUSTMENT TAKING PLACE

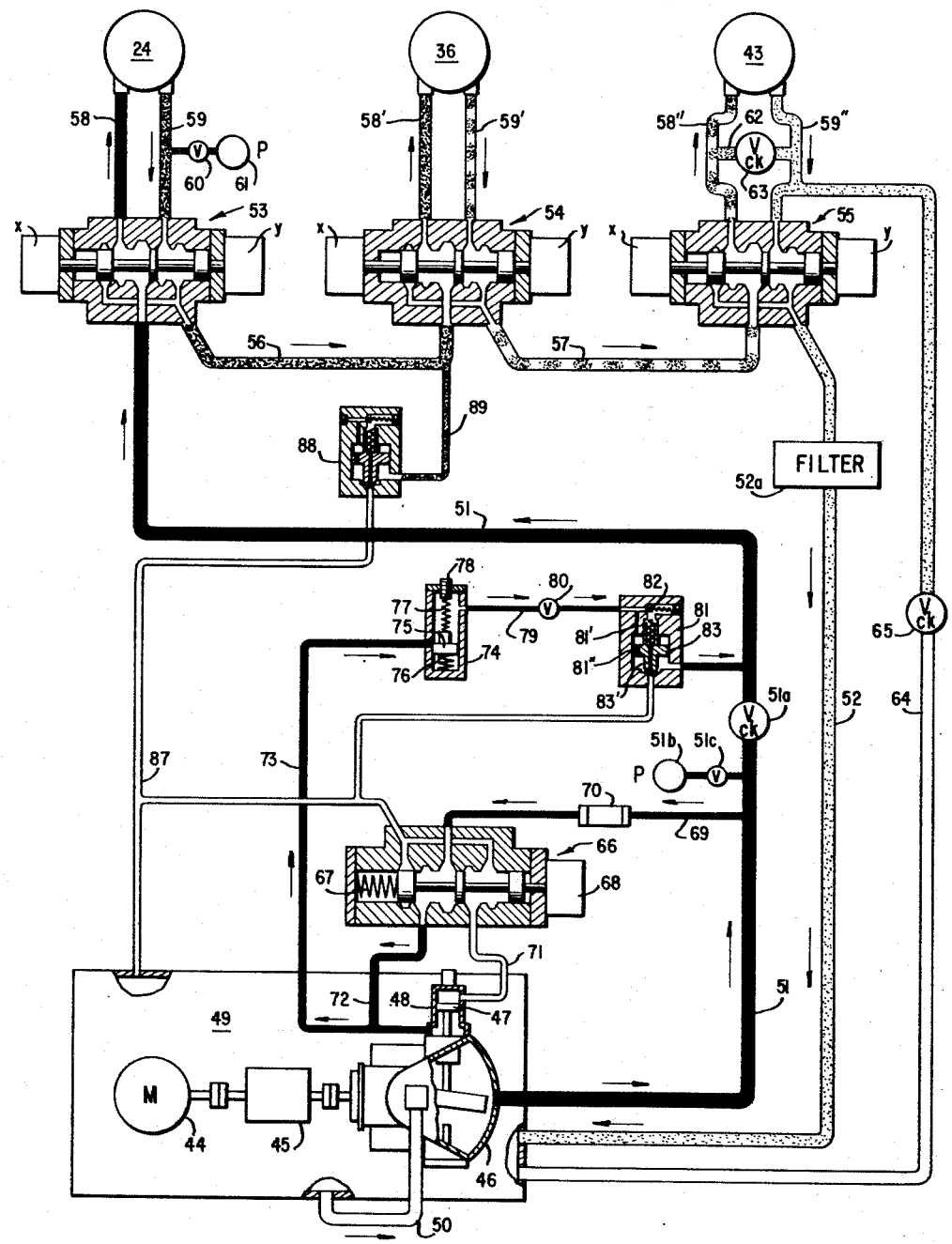
FIG.8 — MILL RUNNING CONDITION
HORIZONTAL & VERTICAL ADJUSTMENTS
TAKING PLACE
INVENTORS
LEWIS H. RUPLE
RICHARD E. PERRY
BY
ATTORNEY

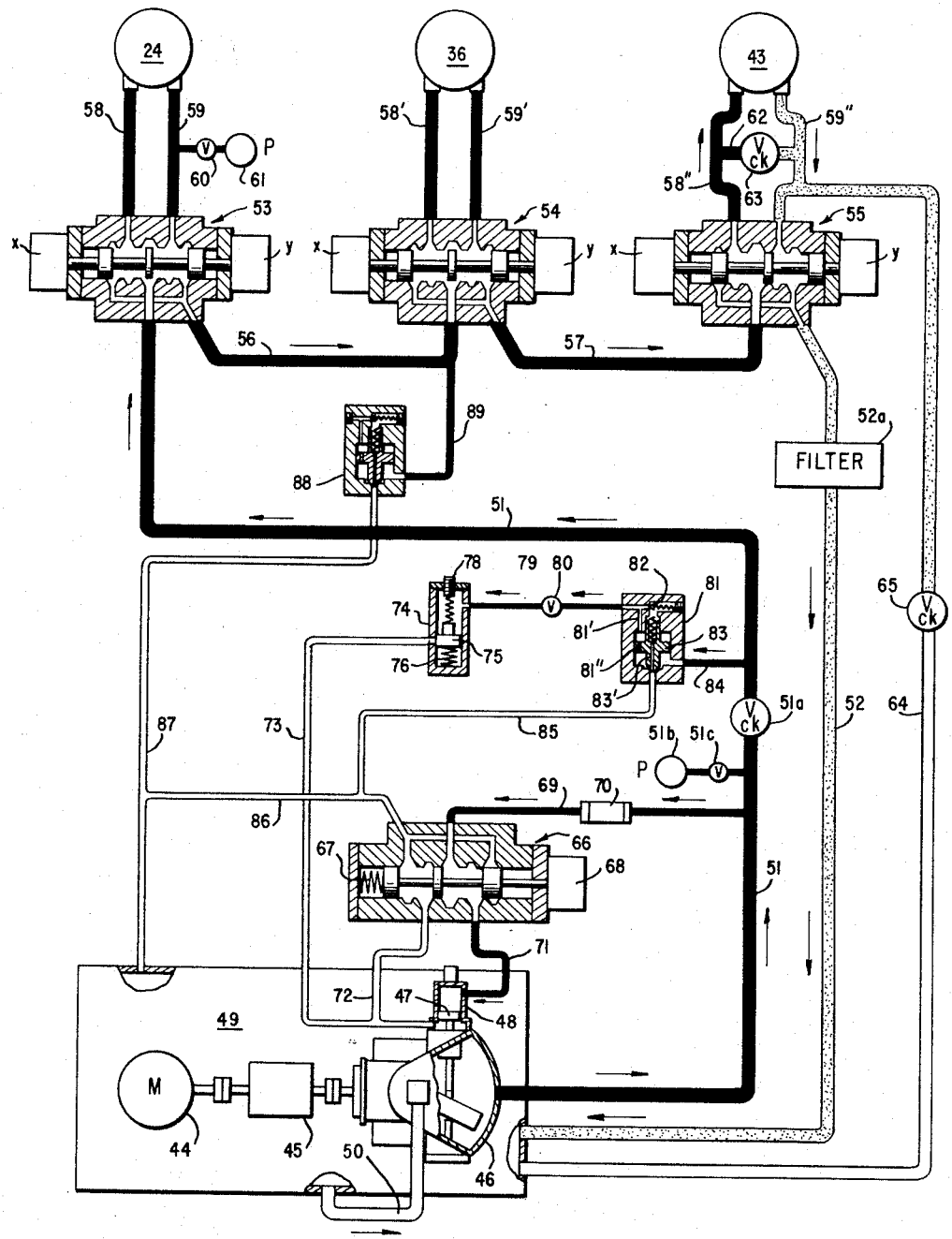
FIG.9 — ELECTRODE DRESSING
NO ADJUSTMENTS TAKING PLACE

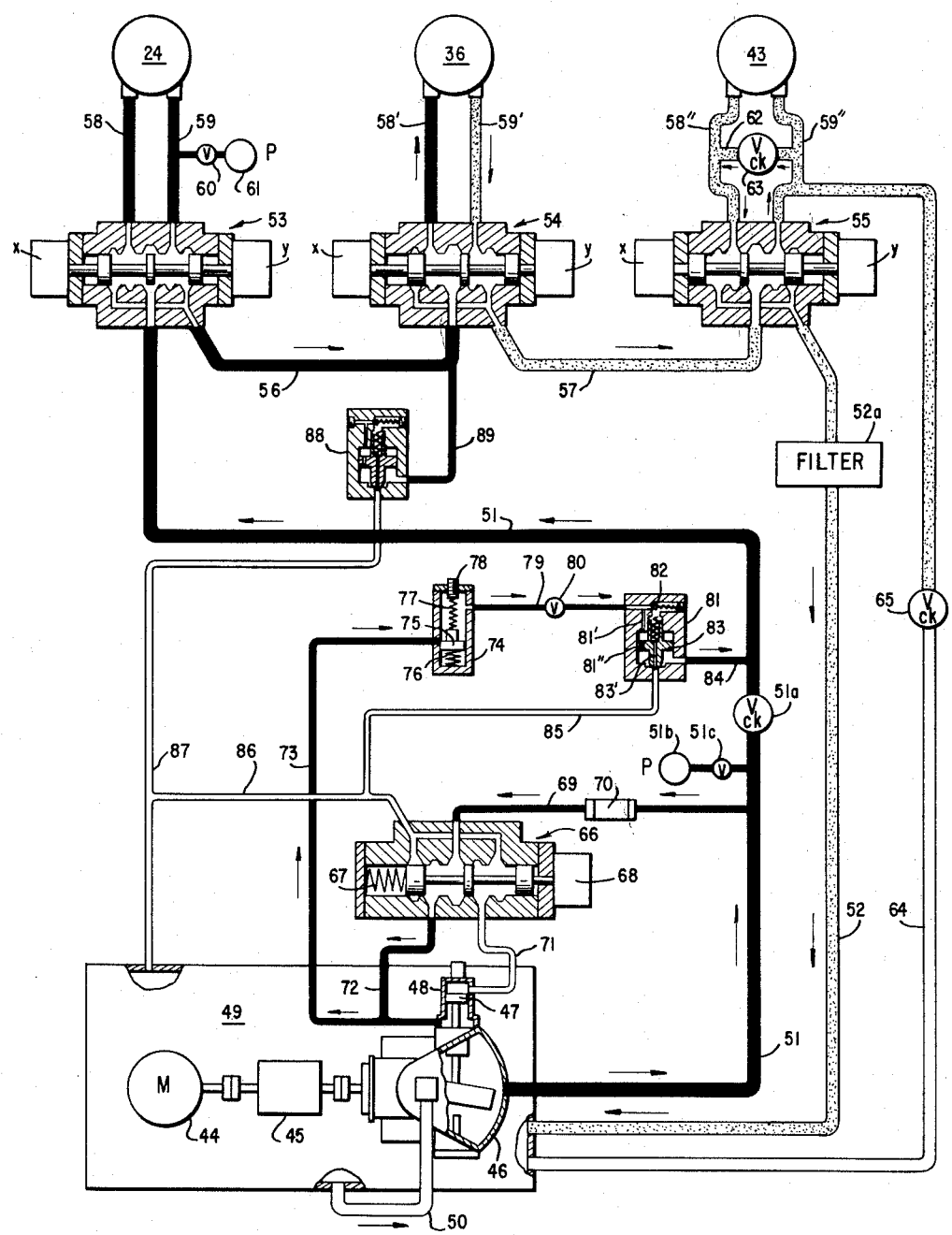
FIG.10 — SLOW HORIZONTAL ADJUSTMENT

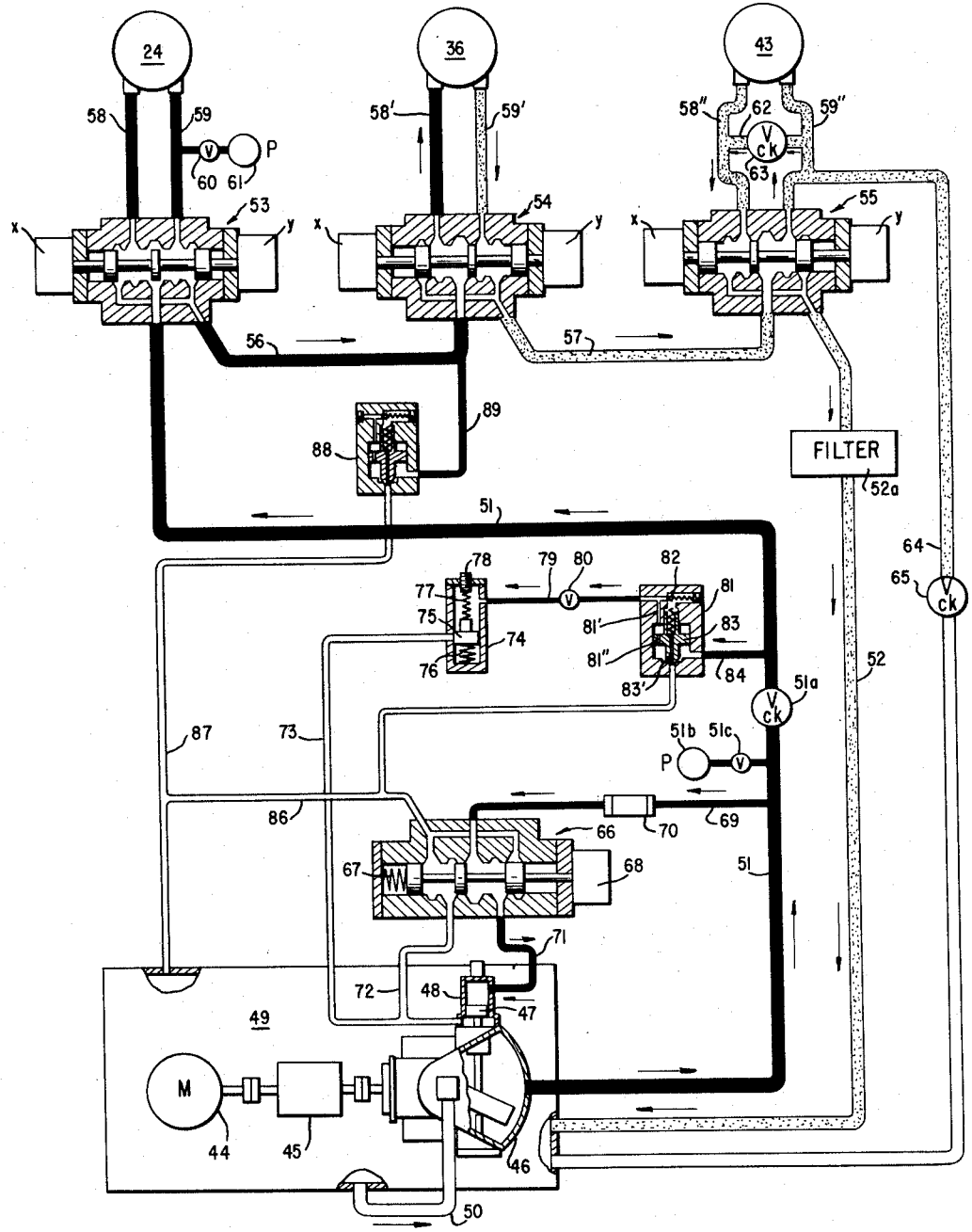
FIG.11 — RAPID HORIZONTAL ADJUSTMENT

United States Patent Office — 3,132,233 — Patented May 5, 1964

3,132,233
HYDRAULIC DRIVE FOR WELDING TRANSFORMER

Richard E. Perry and Lewis H. Ruple, Perrysburg, Ohio, assignors to Abbey Etna Machine Company, Perrysburg, Ohio, a corporation of Ohio
Filed Jan. 10, 1962, Ser. No. 165,383
7 Claims. (Cl. 219—63)

This invention relates to rotary electric resistance welders for tube mills but is concerned particularly with drive for the welding electrodes and adjustments thereof.

An object is to produce a hydraulic system for effecting the drive and adjustments in horizontal and vertical directions for the tube-engaging rotary electrodes.

Another object is to produce a hydraulic drive for rotary welding electrodes so that a high rate of speed can be achieved for dressing the welding surface.

A further object is to drive the rotary welding electrodes and make possible horizontal and vertical electrode adjustments from a single source of power which may be synchronized with drive for the tube mill.

A still further object is to provide hydraulic motors individual to vertical and horizontal electrode adjusting devices and rotary drive means for the electrodes, there being a common source of hydraulic pressure means for the several motors.

A still further object is to effect either rapid or slow vertical or horizontal electrode adjustment as desired, motive force being hydraulically imparted.

A still further object is to provide a hydraulic system for rotating the welding electrodes and effecting horizontal and vertical adjustments thereof in which the hydraulic pressure is controlled and may vary at predetermined stations.

A still further object is to provide an arrangement for hydraulically driving the rotary welding electrodes in such manner as to allow the electrodes to over-run when being driven by the tube from the tube mill since the speed of the tube mill is approximately 10 percent greater than the electrode speed.

Other objects and advantages of the invention will hereinafter appear and, for purposes of illustration but not of limitation, an embodiment of the invention is shown in the accompanying drawings in which FIGURE 1 is a side elevation partly in section of a rotary electric resistance tube welding machine;

FIGURE 2 is a top plan view of the welding machine shown in FIGURE 1, with the cover removed from the vertical adjustment mechanism for the rotary transformer assembly;

FIGURE 3 is a transverse sectional view substantially on the line 3—3 of FIGURE 1;

FIGURE 4 is a transverse sectional view substantially on the line 4—4 of FIGURE 1;

FIGURE 5 is a fragmentary sectional view substantially on the line 5—5 of FIGURE 1;

FIGURE 6 is a diagrammatic view of the hydraulic drive mechanism for the hydraulic motors which are employed respectively for vertical adjustment of the rotary transformer assembly, horizontal adjustment thereof, and for driving the same, the parts being shown in mill running condition without any vertical or horizontal adjustments with respect to the transformer assembly taking place;

FIGURE 7 is a diagrammatic view similar to FIGURE 6 but in this instance the parts are adjusted for the operation under mill running condition but horizontal adjustment of the transformer assembly taking place;

FIGURE 8 is a diagrammatic view similar to the previous views but showing the parts adjusted for the operation of the rotary transformer assembly for mill running condition but showing both horizontal and vertical adjustments thereof taking place;

FIGURE 9 is a similar diagrammatic view but in this instance the parts are adjusted for dressing the electrode wheels, no vertical or horizontal adjustments of the transformer assembly taking place;

FIGURE 10 is a similar diagrammatic view but showing the parts adjusted for slow horizontal adjustment of the welding electrode wheels; and FIGURE 11 is a similar diagrammatic view but showing the parts adjusted to effect rapid horizontal adjustment of the welding electrodes.

The illustrated embodiment of the invention comprises a rotary welding transformer having a standard or supporting base 10 on which is mounted a vertically disposed transformer frame 11 consisting of a pair of laterally spaced pedestals. On the upper portion of the transformer frame is a horizontally disposed superstructure 12 including a platform which supports mechanism hereinafter to be described. Beneath the superstructure 12 and carried by the frame 11 is a horizontally disposed rotary transformer 13 which carries at its front end a pair of laterally spaced electrode wheels or discs 14 of a suitable electrically conductive alloy. The detailed construction of the transformer 13 forms no part of the present invention and further illustration and description thereof are not considered necessary. Reference is made to the U.S. patent to Shenk No. 2,616,016, dated October 28, 1952 and entitled "Rotary Electric Resistance Welder" which contains a detailed description and illustration of a suitable transformer for this purpose.

It will be understood that the electrode wheels 14 engage and roll upon an advancing tube or pipe A formed from an endless strip of sheet metal with the longitudinal edges spaced from each other, these edges being engaged respectively by the electrode wheels 14. Pressure rolls B press the free edges of the tube or pipe A into engagement and electric resistance welding is effected by the engagement of such edges progressively as the tube advances. The tube mill for forming the tube is not shown but is well known in the art and has a series of rolls to progressively shape the flat strips into tube form, these sets of rolls being driven by D.C. motors which are synchronously related.

Vertical adjustment of the rotary transformer 13 may be effected and for this purpose fore and aft slide blocks 15 and 16 are carried by the pedestals of the transformer frame 11 on which they are guided for up and down movements. The slide blocks 15 and 16 carry at their upper ends vertically disposed screw threaded shafts 17. Mounted on the superstructure 12 in suitable housings is a pair of worm wheels 18 which respectively screw threadedly engage the shafts 17. Worms 19 engage the worm wheels 18 thereby to raise or lower the slide blocks 15 and 16 and thereby the rotary transformer 13.

The worms 19 are suitably coupled to horizontal shafts 20, there being flexible couplings 21 arranged respectively on opposite sides of a series of reduction gears disposed within a gear box 22. An input shaft 23 extends to the gears within the gear box 22 at one end and the opposite end of the shaft 23 is connected by a suitable coupling to a piston type hydraulic motor indicated at 24. Thus it will be apparent that the hydraulic motor 24 furnishes the power for driving the worms 19 which in turn rotate the worm wheels 18 to effect the vertical movement of the transformer 13 either upwardly or downwardly. A suitable hydraulic motor 24 is a Vickers constant displacement piston motor, a type well known to those skilled in this art.

As indicated on FIGURE 2 a sprocket and chain drive 25 extends from the horizontal shaft 20 to a shaft 26 which is connected to a suitable counting mechanism 27 disposed on the outside of the frame for visually designating the up and down movement imparted to the rotary transformer frame.

For effecting horizontal adjustment of the transformer 13, the pedestals of the frame 11 are formed with channel ways 28 (FIGURE 5) to engage horizontally elongate platform guides 29. Carried by the pedestals of the transformer frame 11 is a pair of internally screw threaded members 30 which respectively engage a pair of horizontally disposed elongate screw threaded rods 31 connected by couplings 32 to shaft portions extending into reduction gears contained within boxes 33. The reduction gears in the boxes 33 are connected by a transverse shaft 34 and for driving the assembly is an input shaft 35 extending into one of the gear boxes 33. The input shaft 35 is suitably coupled to a hydraulic motor 36 which may be a Vickers constant displacement vane type motor. Thus the screw threaded shafts 31 are conjointly rotated in one direction or the other to shift the transformer frame 11 and associated parts horizontally in one direction or the other in accordance with the drive imparted by the hydraulic motor 36.

Not only are the welding electrode wheels 14 adjustable vertically and horizontally relative to the tube A to be welded, but also the rotary transformer 13 to which the electrode wheels 14 are attached, is also hydraulically driven. As shown, a multiple belt sheave 37 is secured for rotation to the inner end of the rotary welding transformer assembly 13 and this sheave is connected by a plurality of V-belts 38 to a somewhat smaller sheave 39 carried by a horizontal shaft 40. The shaft 40 is connected to reduction gearing contained in the box 41 suspended from a rigid frame 42 fixed to the slide block 16. Suitably connected to the sheave driving shaft 40 is a hydraulic motor 43 which constitutes a Vickers constant displacement piston motor.

Reference is made to FIGURES 6 to 11 showing diagrammatically the drive for the hydraulic motors 24, 26 and 43 and the controls for same. As shown a variable speed D.C. motor 44 provides the power source for the hydraulic motors and this motor may be tied synchronously to all other D.C. motors for the tube mill. As shown the electric motor 44 drives through suitable reduction gearing a Vickers variable displacement piston pump 46 which is provided with a piston 47 operating within a cylinder 48 as a control for same to effect either low displacement and high pressure or high displacement and low pressure. A liquid reservoir 49 is connected to the pump 46 by a tube 50. Leading from the variable displacement pump 46 is a pressure line 51 having a check valve 51a limiting liquid flow only in the direction of the arrows adjacent thereto. A pressure gauge 51b connects to the pressure line 51 which has a suitable manual valve 51c. The pressure line 51 leads to a spool valve 53 for the hydraulic motor 24 and the spool valve 53 is connected to a spool valve 54 for the hydraulic motor 36 by a pressure line 56 and the spool valve 54 is connected to a spool valve 55 for the hydraulic motor 43 by a pressure line 57.

The spool valves 53, 54 and 55 are similar in construction and each constitutes a valve housing $a$ in which is a horizontal cavity containing a horizontally shiftable valve stem $b$ on opposite end portions of which are spools $c$. Intermediate the end spools $c$ is a central spool $d$. Pressure liquid is admitted to the valve housing through a central port $e$ and a pair of laterally spaced outlet ports $f$ are disposed across from the inlet port $e$. One of the ports $f$ may constitute an inlet and the other an outlet under operational conditions and these ports register respectively with lines 58 and 59 which extend to the hydraulic motor 24. The valve housing $a$ is also provided with a horizontal passage $h$ and ports leading to end portions of the valve operating cavity and leading therefrom is a discharge port $g$, which in the case of the valve 53, connects to the line 56 extending to the inlet port $e$ of the valve 54 which is similarly connected by lines 58' and 59' to the hydraulic motor 36. As shown a pressure gauge 61 is connected to the line 59 for the hydraulic motor 24 and has associated therewith a manual valve 60. From the outlet port $g$ of the valve 54 extends the pressure line 57 leading to the inlet port $e$ of the spool valve 55 which controls the operation of the hydraulic motor 43.

The spool valve 55 is similarly connected to the hydraulic motor 43 by lines 58" and 59" but as shown a cross line 62 having an interposed check valve 63 connects intermediate portions of the lines 58" and 59". This arrangement enables hydraulic fluid to pass from the pressure line 59" to the line 58" so as to enable the electrode wheels 14 to over-run when being driven by the tube in the tube mill due to the speed of the mill being approximately 10 percent greater than the speed of the wheels 14.

From the outlet port $g$ of the spool valve 55 is a line 52 which leads back to the reservoir 49 and has an interposed filter 52a. Leading from the line 59 associated with the spool valve 55 is a line 64 also extending back to the reservoir 49 and interposed in this line is a check valve 65 preventing the flow of hydraulic fluid from the spool valve 55 to the reservoir 49 but permitting liquid flow in the opposite direction. Each of the spool valves 53, 54 and 55 is equipped with solenoids at opposite ends, these being indicated at $x$ and $y$ associated with the respective valve stem $b$. By selectively energizing one of the solenoids and de-energizing the other, the respective spool valve is shifted in one direction or the other.

A displacement control valve 66 is provided for controlling the operation of the variable displacement pump 46 and, as shown, this constitutes a spool valve similar in construction to the spool valves above described except that a single solenoid 68 is provided for actuating the valve in one direction, a helical coil spring 67 at the opposite end urges the valve to the right of the housing. The valve 66 has an inlet port $e'$ and outlet ports $f'$ and $f''$. A vent port $g'$ communicates with a lateral passage and port arrangement $h'$ which leads to opposite end portions of the central valve operating cavity.

From the pressure line 51 is a branch line 69 which extends to the inlet port $e'$ of the valve 66 and interposed in this line is a filter 70. From the port $f''$ extends a line 71 to the outer end of the cylinder 47 in which the piston 48 is reciprocal for varying the operation of the pump 46. Leading from the port $f'$ is a line 72 which extends to the inner end of the cylinder 47. In this manner the piston 47 is actuated in one direction or the other according to which of the lines 71 and 72 operates as the pressure and which operates as the discharge line.

Branching from the line 72 is a line 73 extending to a low pressure relief valve 74. This valve for example allows the system to operate at 800 p.s.i. when the solenoid 68 is energized as will hereinafter more fully appear. The relief valve 74 comprises a housing in which is disposed a shiftable spool valve member 75 on opposite sides of which are springs 76 and 77 respectively. Associated with the spring 77 is an adjusting element 78 to vary the tension of the spring. From the relief valve 74 is a line 79 extending to a high pressure relief valve 81 and disposed in that line is a manual valve 80.

The high pressure relief valve 81 for example may be set at 2000 p.s.i. to allow the system to operate at this pressure when the solenoid 68 for the valve 66 is de-energized. The high pressure relief valve 81 has a housing containing an adjustable spring tensioned valve 82. Also disposed therein is a spring tensioned piston valve 83. A port 83' extends through the valve 83 and a port 81' connects the inlet to the valve 81 and the cavity in which the piston valve 83 operates.

Leading from the high pressure valve 81 is a line 84 extending to the pressure line 51. Also leading from the lower end of the valve 81 is a vent line 85 which connects to a vent line 86 extending from the vent port $g'$ of the displacement control valve 66. The vent line 86 connects to a vent line 87 which leads to the reservoir 49 from a low pressure relief valve 88 similar in construction to the valve 81. The relief valve 88 is for the purpose of limiting the pressure supplied to the hydraulic motors 36 and 43 to 800 p.s.i. for example. It will be observed that a line 89 extends from the pressure line 56 to the relief valve 88.

Mill Running Condition—No Transformer Adjustments Taking Place

Referring to FIGURE 6, it will be understood that the rotary transformer is driven so that its electrode wheels 14 effect welding of the tube as the tube mill is in operation. In the diagram shown on this figure no adjustments are taking place either vertically or horizontally with respect to the rotary transformer 11. It will be observed that the solenoid 68 for the displacement control valve 66 is de-energized and the coil spring 67 has shifted the valve to the right of the figure, so that pressure fluid from the branch line 69 passing through the valve 66 passes through the line 72 to the underside of the piston 47 and shifts the same to the position shown so that the variable displacement pump 46 operates at minimum displacement and high pressure. This allows the pressure in the system to rise for example to about 2000 p.s.i. which is adequate for electrode welding force. Both spool valves 54 and 53 for the hydraulic motors 24 and 36 which control the vertical and the horizontal adjustment respectively of the rotary transformer, are in neutral position so that the lines 58, 59, 58' and 59' for these valves contain balanced pressures. However with respect to the valve 55, the solenoid $x$ for this valve is energized and the solenoid $y$ is de-energized to shift the spool valve to the right hand position. This allows liquid under pressure to pass through the valve 55 to the line 58" and drive the piston type hydraulic motor 43 for rotating the rotary transformer 11 through the connections above described. The pressure fluid after passing through the hydraulic motor 43 passes through the line 59" and then through the valve 55 to the reservoir return line 52.

In the operation of the relief valves 81 and 74, liquid under pressure entering the housing of the valve 81 passes through the port 81" and thence through the port 81' to the line 79. From the line 79, liquid enters the valve 74 and depresses the spool 75 compressing the spring 76. This allows liquid under pressure from the line 73 to enter the valve 74. Thus the spool 75 is retained in open position so long as the system is operating under high pressure.

In the event the pressure in the system exceeds a predetermined pressure of 2000 p.s.i. for example, the liquid passing through the ports 81" and 81' unseats the valve 82 so that liquid may pass axially through the spool 83 to the drain line 85. In the event of an abrupt rise in the pressure, the spool 83 may be unseated to afford direct liquid passage to the drain line 85.

Although the relief valve 88 is similar in structure to that of the valve 81, it is adjusted to maintain a low pressure (for example 800 p.s.i.) for the motors 36 and 43. The operation of the relief valve 88 will be understood from the above description, suffice it to say that upon an increase of pressure of the hydraulic liquid supplied to the motors 36 and 43, the liquid from the line 89 is vented through the valve 88 to the vent line 87.

Mill Running Condition—Horizontal Adjustment Taking Place

Referring now to FIGURE 7, the displacement control valve 66 is in the same position as in FIGURE 6. In this case however the solenoid $x$ of the spool valve 54 has been energized and the solenoid $y$ has been de-energized to cause the spool valve to shift to the right of the figure, thereby to enable pressure fluid to pass operatively to the hydraulic motor 36 through the line 58' and then return to the line 59'. The pressure fluid then passes from the spool valve 54 to the valve 55 which has also been shifted to the right by energizing the respective solenoid $x$ and de-energizing the solenoid $y$. The reduced pressure now delivered to the hydraulic motor 43 is sufficient to operate the same for rotating the transformer and its electrode wheels. Thus it will be apparent that during the rotation of the transformer incident to the mill operation, the transformer may be shifted horizontally in one direction or the other. The direction of the horizontal movement of the transformer will depend upon whether the solenoid $x$ or $y$ of the spool valve 54 is energized, as will be apparent. Otherwise the system operates the same as described with respect to FIGURE 6 and the relief valves 74, 81 and 88 function as above set forth.

Mill Running Condition—Horizontal and Vertical Adjustments Taking Place

Referring now to FIGURE 8, the position of the parts is shown for the hydraulic driving of the transformer for use during the tube mill operation, and at the same time for effecting both horizontal and vertical adjustments of the rotary transformer. This is achieved by the shifting of each of the spool valves 53, 54 and 55. As shown the valve 53 is shifted to the right causing the pressure fluid to pass through the line 58 to the motor 24 and therefrom through the line 59. Similarly the solenoid $x$ of the valve 54 has been energized and the solenoid $y$ de-energized thereby to shift the valve to the right of the figure to enable the pressure fluid to pass to the hydraulic motor 36 through the line 58' and from the motor 36 through the line 59'. The fluid at the reduced pressure then passes on to the spool valve 55 which has been shifted to allow the fluid to pass to the hydraulic motor 43 through the line 58" and therefrom through the line 59" for driving the same. Manifestly shifting of the spool valves in the opposite direction results in changing the direction of movement of the respective motors. As shown the valve 66 is adjusted to the position shown and described with respect to the arrangement in FIGURE 6.

Electrode Dressing—No Adjustments Taking Place

Referring to FIGURE 9 the system is adjusted for dressing the electrode wheels and for this purpose it is desirable that the wheels be driven at a relatively high speed. The speed depends upon the speed of the D.C. motor 44. In this case the field of the current of the D.C. motor 44 is weakened as by a rheostat (not shown) in order to achieve the greater speed for dressing. As above mentioned, the motor 44 is tied electrically to all other D.C. motors for the tube mill but for electrode dressing the motor 44 is disconnected from the tube mill motors.

In a conventional mechanical drive, the speed range of the D.C. motor 44 has a ratio of about 8 to 1, due to motor limitations. Therefore a tube mill rated at a minimum mill speed of 40 surface feet per minute has a top electrode dressing speed of approximately 300 surface feet per minute. Such speed is not satisfactory principally because of the time required to perform the work. In this instance the use of the same variable delivery pump 46 enables the driving of the electrodes at a greater speed.

For dressing the electrode wheels the variable delivery pump 46 is shifted automatically to high displacement and low pressure. This combination provides a speed range for the hydraulic motor 43 in the ratio of 45 to 1. The results of this drive allow dressing the electrode wheels at speeds at up to 1800 surface feet per minute. This higher speed means a better finish on the surface of the electrode wheels and utilizes the usual carbide dressing tools to better advantage. At this higher speed the time needed to dress the electrode wheels is reduced about one-sixth of the original time required.

Referring to FIGURE 9 the solenoid 68 for the spool valve 66 is energized to shift the spool valve to the left of the figure compressing the spring 67 to allow liquid under pressure from the branch line 69 to pass through the line 71 and move the piston 47 downwardly thereby adjusting the variable displacement pump 46 to set the latter to maximum displacement and limit the system pressure to 800 p.s.i.

It will be understood that solenoid *x* of the spool valve assembly 55 is energized and solenoid *y* de-energized. This enables liquid under pressure to pass to the hydraulic motor 43 through the line 58″ and discharge therefrom to the line 59″ and then pass through the valve 55 to the reservoir line 52. Since no vertical adjustment or horizontal adjustment of the rotary transformer is desired, all solenoids associated with the spool valves 53 and 54 are de-energized. Since the system is now operating at relatively low pressure, such pressure is maintained by means of the low pressure relief valve 74 which when the pressure exceeds a predetermined degree, pressure fluid is vented through the lines 73 and 86.

In this instance, the valve 82 of the relief valve 81 remains set at high pressure i.e. 2000 p.s.i. Liquid under pressure from the branch line 84 enters the valve 81 at low pressure i.e. 800 p.s.i. or below and finds its way on both sides of the spool 83 through the port 81″. Liquid also passes through the port 81′ and through the line 79 to the relief valve 74 which is adjusted to the low pressure so that under that pressure the spool 75 is closed. Should the hydraulic pressure exceed 800 p.s.i. then the spool 83 of the valve 81 unseats to vent liquid to the drain line 85. Also a smaller amount of liquid can pass to the drain line 73 by the opening of the spool 75 of the valve 74. In operation the spool 75 actually flutters in the process of maintaining the desired pressure.

*Slow Horizontal Electrode Adjustment*

According to the showing in FIGURE 10 adjustment is made for relatively slow horizontal adjustment of the rotary transformer assembly and consequently the electrode wheels 14. This enables the electrode wheels to be properly positioned horizontally relative to the tube to be welded. In this case the solenoid 68 associated with the displacement control valve 66 is de-energized so that the spring 67 shifts the valve to the right of the figure thereby enabling liquid under pressure to pass through the branch line 69 through the valve 66, the line 72 and introduce liquid under pressure to the underside of the piston 47 to raise it and accordingly set the variable displacement pump 46 to a minimum displacement and high pressure, and enable the pressure to rise to approximately 2000 p.s.i. This adjustment enables the liquid above the piston 47 to be vented through the line 71, port *f″*, passage *h′*, port *g′* and through the lines 86 and 87 to the reservoir 49.

It will also be apparent that the solenoid *x* associated with the spool valve 55 is de-energized and the solenoid *y* associated with this valve is energized thereby causing the valve member to be shifted to the left of the figure. This prevents operation of the hydraulic motor 43 inasmuch as the liquid under pressure may pass to the line 59″ and then laterally through the branch line 62 past the check valve 63, to the line 58″ and thence through the valve 55 to the reservoir 49 through the reservoir return line 52.

Solenoid *x* for the valve 54 is energized and the solenoid *y* is de-energized shifting the valve to allow liquid under pressure to pass through the line 58′ to the hydraulic motor 36 for effecting the horizontal adjustment of the electrode wheels 14. After passing through the motor 36 the liquid passes through the line 59′ to the spool valve 55 through the line 57. This allows for fine horizontal adjustment of the electrode wheels at a rate of about .9 inch per minute. Manifestly such slow horizontal adjustment of the electrode wheels is important in properly positioning the electrodes with respect to the tube to be welded.

Also it will be understood that vertical adjustment of the electrode wheels 14 can be made slowly by energizing the solenoid *x* and de-energizing the solenoid *y* of the spool valve 53 which controls the hydraulic motor 24. This enables fine adjustment of the vertical position of the electrode wheels at a rate of one-quarter inch per minute.

It will be understood at this time the pump motor 44 is separate from the mill speed control and it is set at approximately 1600 r.p.m. by means of a field weakening rheostat (not shown). The relief valves 74, 81 and 88 in this case operate as described in connection with FIGURE 6.

*Rapid Horizontal or Vertical Adjustment of Electrodes*

Referring now to FIGURE 11, the adjustment for the rapid horizontal adjustment of the rotary transformer 11 and electrode wheels is shown. For this purpose the solenoid 68 of the displacement control valve assembly 66 is energized to shift the spool valve to the left of the figure and allow liquid under pressure from the branch line 69 to pass through the valve to the line 71 for shifting the piston 47 downwardly and thereby disposing the variable displacement pump 46 for maximum displacement and limit the system pressure to approximately 800 p.s.i.

At the same time the solenoid *x* of the spool valve assembly 55 is de-energized and the solenoid *y* of this valve is energized for shifting the valve to prevent rotation of the motor 43 controlling the rotation of the transformer assembly 11. Similarly the solenoid *x* and *y* of the spool valve assembly 53 are energized to prevent operation of the hydraulic motor 24. However with respect to the spool valve assembly 54, the solenoid *x* is energized and the solenoid *y* is de-energized for shifting the valve for enabling the flow of liquid under pressure to the hydraulic motor 36 for driving the same. This enables rapid horizontal adjustment of the rotary transformer assembly 11 at a rate of 12.1 inches per minute. Reference is made to the description relative to FIGURE 9 for the operation of the relief valves since in this instance they operate in the same manner.

In the event that rapid vertical adjustment of the rotary transformer 11 is desired, then instead of operating the hydraulic motor 36, the hydraulic motor 24 is operated by energizing the solenoid *x* of the spool valve assembly 53 and de-energizing the solenoid *y* of this assembly. This enables rapid adjustment of the vertical position of the electrode wheels at a rate of three and one-quarter inches per minute.

For effecting rapid horizontal or vertical electrode adjustment, the pump motor 44 is separated from the mill speed control and is set at 2300 r.p.m. by means of a field weakening rheostat (not shown).

*Jog Reverse*

At certain times it becomes necessary to reverse the operation of the tube mill for a few feet and this is known in the trade as "jog reverse." At this time the electrode wheels 14 are frictionally driven in a reverse direction by the rearward movement of the formed tube. The arrangement is such that the hydraulic motor 43 draws liquid from the reservoir 49 through the line 64 past the check valve 65 and, through the line 59″ discharges liquid through the line 58″ and then to the return line 52 to the reservoir at zero pressure. This assumes the solenoid *y* has been energized and the solenoid *x* of the valve 55 is de-energized as in FIGURE 11.

From the above description it will be apparent that we have produced a rotary drive for the electrode wheels applied through a hydraulic system wherein the speed of the electrode wheels during mill running conditions is solely a function of the speed of the D.C. motor 44. In this drive the tube to be welded may overdrive the electrode wheels without slippage or the need of an overrunning clutch. The drive for the electrode wheels applied through a hydraulic system is obtained wherein the speed of the electrode for dressing purposes is obtained by increasing the motor speed and the pump displacement resulting in a speed approximately 45 times greater than the low mill running speed. The dressing operation for this drive requires less than 20 percent of the time needed with the conventional drive.

Horizontal and vertical adjustments of the electrode wheels 14 are effected through a hydraulic system in which adjustments may be made at a variable rate of speed depending upon the motor speed and the pump displacement. It will be noted that the vertical downward setting of the electrode wheels may be made slowly at high pressure to obtain necessary welding force upon the tube to be welded or rapidly when this force is not necessary, for example for roll change over. Horizontal electrode setting may be made slowly when the electrode wheels are in contact with the tube or rapidly to obtain clearance for roll change over. Such adjustments may be made simultaneously or separately with electrode wheels rotating or stationary. It will further be noted that each of the individual drive trains are protected against shock by the hydraulic relief valves 74, 81 and 88. The load is applied in a softer method due to slight compression of oil during pressure build up. The relief valves also protect the motor 44 from overloading.

Numerous changes in details of construction and arrangement and operation may be effected without departing from the spirit of the invention especially as defined in the appended claims.

What we claim is:

1. Driving control mechanism for a rotary electrode-wheel-carrying welding transformer comprising
   (a) a motor-driven hydraulic pump,
   (b) a hydraulic motor operatively connected to the transformer for imparting rotation thereto,
   (c) a hydraulic motor operatively connected to the transformer for imparting up and down movements thereto,
   (d) a hydraulic motor operatively connected to the transformer for imparting horizontal movements thereto,
   (e) actuatable directional valve means associated with each of said hydraulic motors respectively for directing the flow of liquid thereto thereby to drive said motors separately or any combination thereof,
   (f) tube connections between said valves to enable liquid flow successively from the first valve means to the second and from the second to the third valve means,
   (g) a tube connection from said hydraulic pump to the first of said valve means,
   (h) a liquid reservoir communicating with said hydraulic pump, and
   (i) a drain line from the third of said valve means to said reservoir.

2. Driving control mechanism as claimed in claim 1 in which the actuatable directional valve means comprises a spool valve associated operatively with each hydraulic motor, and solenoid means for shifting each valve in one direction or the other thereby to enable the hydraulic motors to be driven in one direction or the other.

3. Driving control mechanism as claimed in claim 1 in which the hydraulic pump is of the variable displacement type, and means for adjusting said pump for increasing or decreasing the liquid displacement thereof.

4. Driving control mechanism as claimed in claim 1 in which the hydraulic pump is of the variable displacement type, electrohydraulic means for adjusting said pump, and pressure relief valves interposed in the system for automatically predetermining the liquid pressure so that the system operates at maximum pressure when the pump is operating at minimum displacement and at minimum pressure when the pump is operating at maximum displacement.

5. Driving control for a rotary electrode-wheel-carrying transformer comprising (a) a hydraulic motor operatively connected to the transformer for rotating same and the electrode wheels,
   (b) a hydraulic motor operatively connected to the transformer for imparting vertical movements thereto,
   (c) a hydraulic motor operatively connected to the transformer for imparting horizontal movements thereto,
   (d) a pair of liquid-carrying lines for each hydraulic motor, one constituting a pressure line and the other a drain line,
   (e) an adjustable directional valve associated with each pair of lines thereby to cause liquid under pressure through one line or the other for controlling the direction of rotation of the respective motor,
   (f) a pressure line from the valve for the vertical adjustment motor to the horizontal adjustment motor,
   (g) a pressure line from the valve for the horizontal adjustment motor to the transformer-electrode drive motor,
   (h) a liquid reservoir,
   (i) a drain line from the electrode-drive motor to the reservoir,
   (j) a motor driven variable displacement pump supplied by liquid from said reservoir,
   (k) a pressure line from said pump to the directional valve for the vertical adjustment motor,
   (l) a line extending from the directional valve for the horizontal adjustment motor to the reservoir,
   (m) and a pressure relief valve in said last line for enabling the hydraulic pressure delivered to the horizontal adjustment motor and the transformer-electrode drive motor to be substantially less than that delivered to the vertical adjustment motor.

6. Driving control for a rotary electrode wheel-carrying transformer as claimed in claim 5 comprising
   (a) a hydraulic device for shifting said variable displacement pump for effecting high displacement and low hydraulic pressure or for effecting low displacement and high hydraulic pressure,
   (b) an adjustable displacement control valve communicating respectively with the pressure line to the vertical adjustment motor and to said hydraulic shifting device whereby upon actuation of said displacement control valve the operation of the variable displacement pump is selectively controlled,
   (c) and relief valve means operatively connected to the pressure line for the vertical adjustment motor and the displacement control valve and also draining to the reservoir thereby to limit the hydraulic pressure in such pressure line to the valve determined by the adjustment imparted to the displacement control valve.

7. Driving control for a rotary electrode wheel carrying transformer as claimed in claim 6 comprising a branch line connecting the pair of liquid-carrying lines for the electrode drive motor, a check valve in said branch line for enabling additional liquid to be supplied to one of the said liquid-carrying lines in the event the electrode wheels are overdriven as by an advancing tube from a tube mill, and a check valve controlled line from the reservoir for supplying such additional liquid.

References Cited in the file of this patent

UNITED STATES PATENTS

| | | |
|---|---|---|
| 1,022,025 | Guay | Apr. 2, 1912 |
| 2,265,627 | Caputo | Dec. 9, 1941 |
| 2,283,940 | Morris | May 26, 1942 |
| 2,293,846 | Nichols | Aug. 25, 1942 |
| 2,336,403 | Kaunitz | Dec. 7, 1943 |
| 2,537,503 | Abbey | Jan. 9, 1951 |